United States Patent
King et al.

[15] 3,669,935
[45] *June 13, 1972

[54] THERMALLY STABLE POLYESTER FIBERS HAVING INHERENT OIL-STAIN RELEASE PROPERTIES

[72] Inventors: Henry L. King; Eugene L. Ringwald, both of Cary, N.C.; James C. Randall, Bartlesville, Okla.

[73] Assignee: Monsanto Company, St. Louis, Mo.

[*] Notice: The portion of the term of this patent subsequent to June 6, 1989, has been disclaimed.

[22] Filed: Nov. 6, 1969

[21] Appl. No.: 874,638

Related U.S. Application Data

[63] Continuation-in-part of Ser. No. 789,528, Jan. 7, 1969, abandoned, Continuation-in-part of Ser. No. 824,092, May 13, 1969.

[52] U.S. Cl. ..................................... 260/77, 8/DIG. 4
[51] Int. Cl. ............................................. C08g 17/08
[58] Field of Search ........................................ 260/77

[56] References Cited

UNITED STATES PATENTS

| | | |
|---|---|---|
| 2,895,946 | 7/1959 | Huffman ..................... 260/75 |
| 2,905,657 | 9/1959 | Huffman ..................... 260/75 |
| 3,033,824 | 5/1962 | Huffman ..................... 260/75 |
| 3,042,656 | 7/1962 | Frey ........................... 260/77 |
| 3,223,752 | 12/1965 | Tate et al. .................. 260/873 |
| 2,556,295 | 6/1951 | Pace et al. ................ 260/75 X |
| 3,461,468 | 8/1969 | Morgan et al. ............ 260/75 T |

*Primary Examiner*—Melvin Goldstein
*Attorney*—Thomas Y. Awalt, Jr., Robert L. Broad, Jr., Neal E. Willis and Elmer J. Fischer

[57] ABSTRACT

Thermally stable fiber-forming polyesters having inherent oil-stain release properties are produced from dicarboxylic acids, or reactive derivatives thereof, glycols and small amounts of mixtures of compounds having a typical general formula: R—O[G—O]$_x$—H, where R is an alkyl group containing an average of at least eight carbon atoms; G is a hydrocarbon radical selected from the group consisting of ethylene, propylene and isomers thereof, and mixtures of the above; and $x$ has an average value at least equal to or greater than 9, and no greater than about 20.

11 Claims, 6 Drawing Figures

LOSS OF FORMALDEHYDE OF VARIOUS
ETHYLENE OXIDE POLYETHERS

INVENTORS
HENRY L. KING
EUGENE L. RINGWALD
JAMES C. RANDALL

BY *Thomas J. Axell Jr*
ATTORNEY

INVENTORS
HENRY L. KING
EUGENE L. RINGWALD
JAMES C. RANDALL

BY *Thomas J. Oswald Jr.*
ATTORNEY 3,669,935

THERMALLY STABLE POLYESTER FIBERS HAVING INHERENT OIL-STAIN RELEASE PROPERTIES

This is a continuation-in-part application of our co-pending applications Ser. No. 789,528, filed Jan. 7, 1969 and now abandoned, and Ser. No. 824,092, filed May 13, 1969.

BACKGROUND OF THE INVENTION

This invention relates to polyesters produced by condensation reactions of polymethylene glycols and dicarboxylic acids or reactive derivatives thereof.

It is well known that some polymeric polyesters prepared by the condensation of a glycol or its functional derivatives and a dicarboxylic acid or a polyester-forming derivative thereof, such as an acid halide, a salt, or a simple ester of a dibasic acid and volatile monohydric alcohol are excellent fiber-forming polymers. Commercially, highly polymeric polyesters are prepared, for example, by the condensation of terephthalic acid or dimethyl terephthalate and a glycol containing from about two to ten carbon atoms. These polyesters are relatively insoluble, chemically inactive, hydrophobic materials capable of being formed into filaments which can be cold-drawn to produce textile fibers of superior strength and pliability. However, it is well-known that these materials are highly susceptible to oil staining, and once stained with an oil-type stain, are extremely difficult if not impossible to restore to an unstained condition.

Unmodified polyesters are presently being treated externally with finishes and the like in order to provide a measure of oil-stain resistance and oil release. Unfortunately, these finishes are expensive to apply, and being applied externally, are, as a general rule, easily removed by washing.

SUMMARY OF THE INVENTION

It is an object of this invention to provide a process for preparing synthetic linear condensation polyesters suitable for production of filaments, fibers, fabrics, and the like which have the inherent permanent capability of releasing oil-type stains without sacrificing the inherent heat stability of unmodified polyesters.

It is yet another object of this invention to provide a chain-terminating agent suitable for the production of synthetic linear condensation polyesters for use in the production of filaments, fibers, fabrics, and the like which have inherent permanent oil-type stain releasing characteristics, and thermal stability in the presence of air.

Briefly, the objects of this invention are accomplished by preparing a fiber-forming polyester from a dicarboxylic acid and a glycol and containing in the polymer a small amount of compounds having a typical general formula: R—O[G—O]$_x$—H, where R is an alkyl group containing an average of at least eight carbon atoms, G is a hydrocarbon radical selected from the group consisting of ethylene, propylene and isomers thereof, and mixtures of the above; and $x$ has an average value equal to or greater than 9, and no greater than about 20. Mixtures of these compounds may also be used. The additive may be used at concentrations of from about 0.25 mole percent to about 3 mole percent based on the moles of the dibasic acid or derivative employed (the upper limit being dictated primarily by processability considerations) with a preferred mole percent concentration of from about 0.75 using the higher molecular weight compounds, to about 2.0 when using the lower molecular weight compounds.

The use of alkoxy polyethylene glycols to modify polyesters, as taught, for example, in U.S. Pat. No. 2,905,657, was seen to increase the dyeability of these polyesters, at the same time sacrificing heat stability, and with no apparent effect on the capability of fibers, filaments and fabrics produced from these polyesters to resist and release oily stains.

The modified polyester compositions of this invention are prepared by reacting an aromatic dicarboxylic acid, the polymethylene glycol and a small amount of the alkoxy glycol additive under polyesterification conditions until a fiber-forming polymeric polyester composition is obtained. Small amounts of a chain-branching agent may also be added to the reaction as desired.

The modified polyester compositions of the present invention are useful in the production of shaped articles by extrusion, molding, or casting in the nature of yarns, fabrics, films, pellicles, bearings, ornaments, or the like. They are particularly useful in the production of thermally stable textile fibers having improved dyeability, particularly with disperse dye.

To further understand the invention, reference will be made to the attached drawing that forms a part of the present application.

FIG. 1 is a graph showing the amount of formaldehyde loss at 195° C. for 60 minutes of alkoxy polyethylene glycols varying in the number of ethylene oxide units present in the molecules;

FIG. 2 is a graph showing the amounts of mineral oil retained on samples of fabric produced in accordance with this invention using various amounts (in terms of weight % based on the weight of the polymer) of a typical alkoxy polyethylene glycol (a reaction product of 14 molar equivalents of ethylene oxide with an approximately equimolar mixture of straight chain alcohols having 14–15 carbon atoms), the fabric having been saturated with mineral oil, and subsequently washed with a standard detergent and rinsed; all as described below for testing of oil-stain release characteristics;

Figure 5:
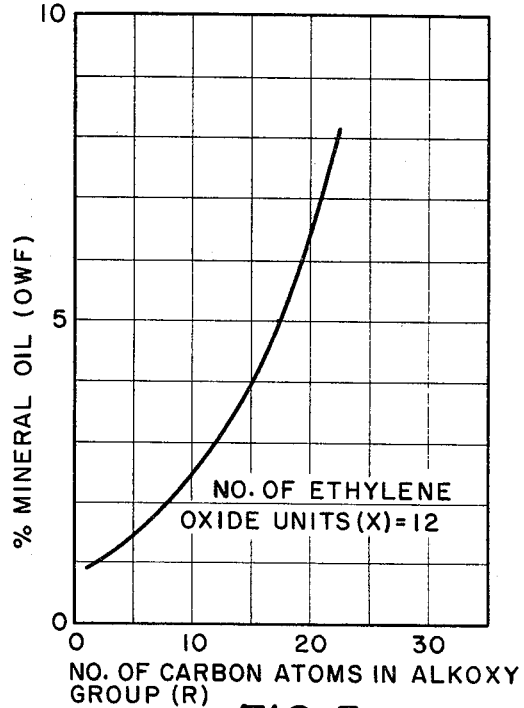
Figure 6:
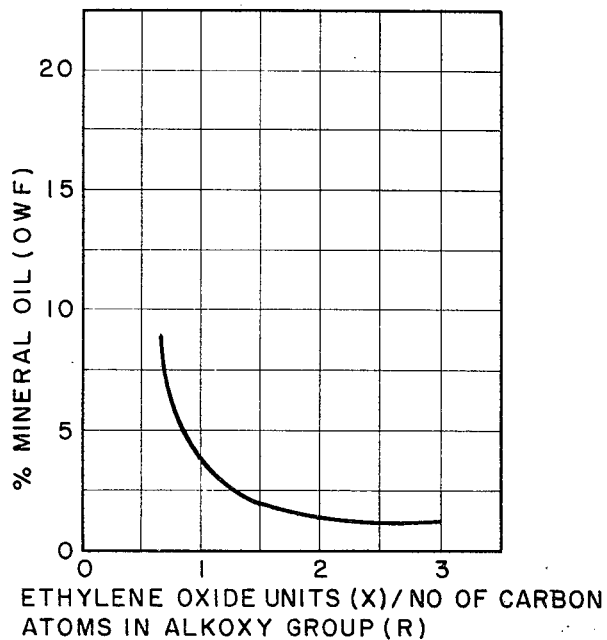

FIG. 5 is a graph showing the effect in terms of mineral oil retention (percent o.w.f.) of changes in the number of carbon atoms in the alkyl group (R) of the alkoxy polyethylene glycol, where the number of ethylene oxide units ($x$) was held constant at about 12; and FIG. 6 is a graph showing the relationship of the ratio of ethylene oxide units ($x$) to the number of carbon atoms in the alkyl group (R) of the alkoxy polyethylene glycol, in terms of mineral oil retention (percent o.w.f.).

DESCRIPTION OF THE PREFERRED EMBODIMENTS

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by drawing. Among the polyesters and copolyesters specifically useful in the instant invention are those resulting from heating one or more of the glycols of the series HO(CH$_2$)$_n$OH, in which "$n$" is an integer from 2 to 10, or cycloaliphatic glycols, with one or more dicarboxylic acids or ester-forming derivatives thereof. Among the dicarboxylic acids and ester-forming derivatives thereof useful in the present invention there may be named terephthalic acid, isophthalic acid, p,p'-dicarboxybiphenyl, p,p'-dicarboxydiphenylsulfone, p,p'-dicarboxydiphenylmethane, and the aliphatic, cycloaliphatic, and aryl esters and half-esters, ammonium and amine salts, and the acid halides of the above-named compounds, and the like. Examples of the polyhydric alcohols which may be employed in practicing the instant invention are ethylene glycol, trimethylene glycol, and tetramethylene glycol, cyclohexane dimethanol, and the like. Polyethylene terephthalate, however, is the preferred polymer because of the ready availability of terephthalic acid or dimethyl terephthalate and ethylene glycol, from which it is made. It also has a relatively high melting point of about 250° through 265° C., and this property is particularly desirable in the manufacture of filaments in the textile industry.

The additives which are an essential part of this invention are compounds having a typical general formula: $R-O[G-O]_x-H$, where R is an alkyl group containing an average of at least eight carbon atoms; G is a hydrocarbon radical selected from the group consisting of ethylene, propylene and isomers thereof, and mixtures of the above; and $x$ has an average value equal to or greater than 9, and no greater than about 20. By "average" is meant that the alkoxy glycol additive may comprise mixtures of the alkoxy glycol with some variances from the figures shown; but that the average of the integers in the mixture will be as indicated. Preferably, the R group contains 12–16 carbon atoms. As the degree of polymerization ($x$) increases, so does the inherent capability of resisting and releasing oil-type stains in a fabric prepared from the ester. The additive may be used at concentrations of from about 0.25 to 3 mole percent based on the moles of the dibasic acid or derivative with a preferred mole percent concentration of from about 0.75, using the higher molecular weight compounds, to about 2.0, using the lower molecular weight compounds.

Autoxidation is the phenomenon which is responsible for much of our environmental chemistry. It is involved in the ageing of fats and oils, drying of paints, and degradation of natural and synthetic fibers. The processes involved may be catalyzed by heat or light and are free radical by nature. Generally speaking, autoxidation proceeds by free radical, chain mechanisms; peroxy radicals and hydroperoxide groups are formed which are precursors to other products. Typical products from autoxidation processes are alcohols and carbonyl-containing compounds. Chain-terminating reactions significantly affect the rates of autoxidation processes.

The products observed from the autoxidation of alkoxy polyethylene glycols are principally alcohol and formate ester chain-terminal groups and formaldehyde, carbon dioxide, and water. Formaldehyde is a major volatile product. As above stated, significant and surprising differences in thermal stability in the presence of oxygen have been observed among the various alkoxy polyethylene glycols. The type of alkoxy unit and the degree of polymerization are apparently related to the susceptibility of autoxidation.

It has been found, for example, that as the number of carbon atoms in the alkoxy end group (R) is increased beyond the methoxy (with degree of polymerization held constant) there is a surprising decrease in the amount of formaldehyde evolved when the glycol additive is heated in a sweep of air at 193° C., until the alkoxy group reaches eight carbon atoms, after which there is a leveling off. Further increase beyond 8–14 carbon atoms in the alkoxy group causes no appreciable difference in the heat stability of the glycol. Exemplifying the above, alkoxy-terminated polyethylene glycol polymers having the structural formula: $R-(OCH_2CH_2)_{12}-OH$, were subjected to the above-described conditions, and liberated formaldehyde in accordance with the following table.

TABLE I

| R-Number of Carbon Atoms in Hydrocarbon Unit | 15 min Min. | 30 Min. | 60 Min. | mol HCHO 90 Min. | 120 Min. |
|---|---|---|---|---|---|
| 1 | 460 | 800 | 1340 | 1520 | 1700 |
| 4 | 460 | 790 | 1050 | 1140 | 1300 |
| 8 | 320 | 470 | 600 | 720 | 820 |
| 14.5* | 320 | 510 | 770 | 820 | 880 |
| 20 | 320 | 450 | 760 | 720 | 790 |

*Alkoxy glycol prepared from mixture of 14 and 15 carbon alcohols.

It was also discovered that when these same alkoxy glycols were used as chain terminators in the production of modified polyesters, the heat stability effect was carried over to the polyester fiber.

Figure 1:
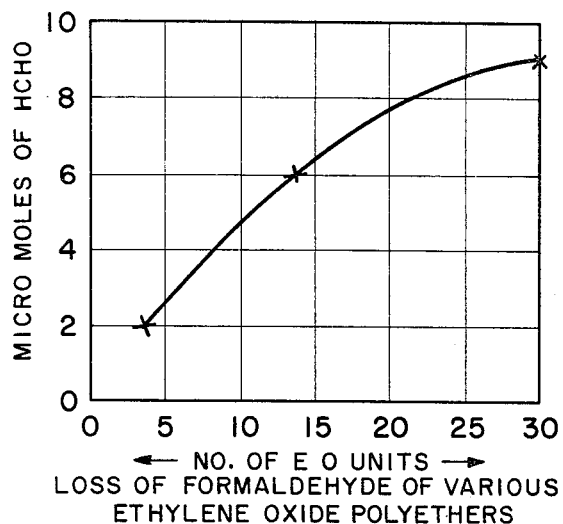

On the other hand, where the number of carbon atoms in the alkoxy end group was held constant at about 14 and the degree of polymerization of the polyether chain was increased, the compounds being heated in a sweep of air at 195° C., for 60 minutes, there was a marked increase in the number of micro-moles of formaldehyde released as the degree of polymerization (number of ethylene oxide units) was increased from about 5 to 30, indicating a decrease in heat stability of the alkoxy glycol as shown by FIG. 1. Therefore, so far as heat stability alone is concerned, it appears that an alkoxy poly(oxyalkylene) glycol as described above where R is an alkyl group containing no less than eight carbon atoms, and with an extremely low degree of polymerization would be optimum.

Figure 3:
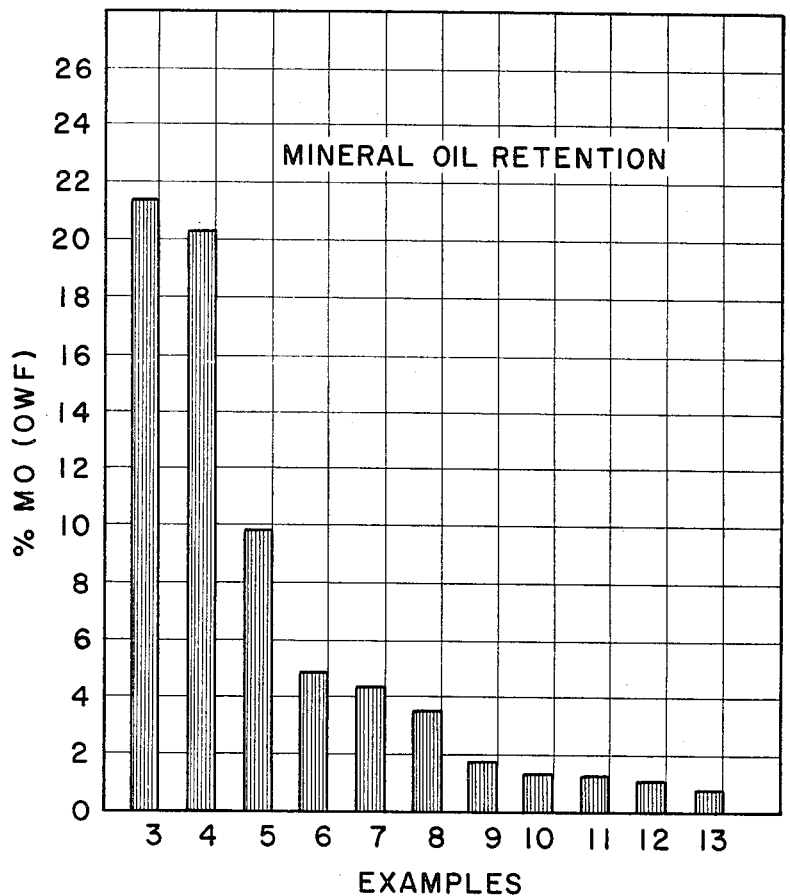
FIG. 3 is a bar graph showing varying amounts of mineral oil ( percent o.w.f.) retained on similar fabric samples using the same weight percent of various alkoxy polyethylene glycol chain terminators.

As shown in FIG. 3 (the compound structure being described under examples 3–13), however, a degree of polymerization ($x$) of 9 is minimally optimum so far as comparative oil stain release properties are concerned. Much more preferrable are the alkoxy poly(oxyalkylene) glycols with a degree of polymerization of 12 or more from the standpoint of oil stain retention and release.

Figure 4:
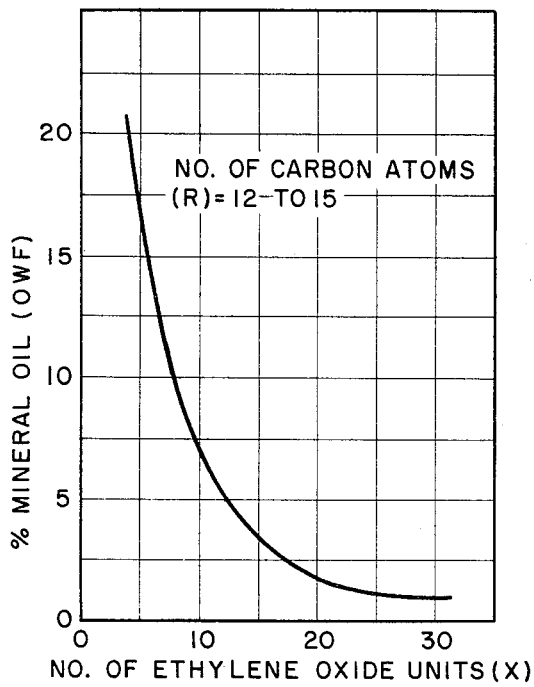
FIG. 4 is a graph showing the effect of increases of the number of ethylene oxide units ($x$) on mineral oil stain retention where the number of carbon atoms in the alkyl group (R) of the alkoxy polyethylene glycol is held constant at from 12–15, the amount of the alkoxy polyethylene glycol being used in each case being 5 percent by weight based on the polymer.

FIGS. 4, 5 and 6 illustrate that although the degree of polymerization ($x$) is the most significant single factor in characterizing the alkoxy poly(oxyalkylene) glycols in terms of oil stain release, especially good results are obtained where the ratio of ethylene oxide units ($x$) to the number of carbon atoms in the alkyl group (R) is about equal to or greater than one. This is not to say that satisfactory oil stain release qualities may not be obtained unless the ratio of $x$ to R is about equal to or greater than 1; for commercially acceptable inherent oil stain release qualities (under 10 percent of retention) may be obtained where the ratio is less than 1 (see examples 7 and 9); however, for exceptionally fine oil-stain release qualities (3 percent retention or less based on the testing described) this ratio applies.

A minimum optimum value of 8 representing the number of carbon atoms in the alkoxy end group has thus been established on the basis of heat stability, and a minimum optimum value of 9 as a degree of polymerization, has been established on the basis of oil stain retention and release characteristics, recognizing that as the degree of polymerization is increased, there is a corresponding decrease in heat stability, with $x=20$ being maximally acceptable.

The precise structure of G is not considered critical in the instant invention except insofar as it must exclude the alkoxy(polyoxymethylene) glycols which depolymerize under polyester polymerization conditions. We have found that the alkoxy poly(oxyethylene) and alkoxy poly(oxypropylene) glycols (including copolymers and block copolymers) and mixtures thereof produce good results in accordance with this invention.

The above can be partially explained in terms of inhibition of further autoxidation by products formed from the terminal alkoxy group in the initial stage of oxidation. Those derived from short alkyl chains are volatile at the test temperature, and escape without acting as inhibitors.

When the additive contains an alkoxy group which is an effective inhibitor of autoxidation, the number of alkyleneoxy units in the polyether additive becomes significant. It has been found that chains having more than about 25 units are not adequately stable. This is believed to result from the low concentration of the inhibiting terminal alkoxy group in such a chain. On the other hand, a low number of alkyleneoxy units per molecule results in an excessive number of chain terminations when an adequate weight of the modifier is added to achieve the desired oil-stain release characteristics. Poor processability results from excessive chain termination.

If desired, the modified polyesters of this invention may contain chain-branching agents, which, as taught in U.S. Pat.

No. 2,895,946, are employed to increase the viscosity of molecular weight of the polyesters, such as polyols which have a functionality greater than 2, that is, they contain more than two function groups, such as hydroxyl. Examples of suitable compounds are pentaerythritol; compounds having the formula: $R-(OH)_n$ wherein R is an alkylene group containing from three to six carbon atoms and $n$ is an integer from 3 to 6, for example, glycerols, sorbitol, 1,2,6-hexanetriol and the like; compounds having the formula: $R-(CH_2OH)_3$ wherein R is an alkyl group containing from two to six carbon atoms, for example, trimethylol ethane, trimethylol propane, and the like compounds up to trimethylol hexane; and the compounds having the formula:

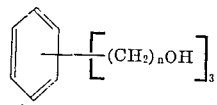

wherein $n$ is an integer from 1 to 6. As examples of compounds having the above formula, there may be names 1,3,5-trimethylol benzene, 1,3,5-triethylol benzene; 1,3,5-tripropylol benzene, 1,3,5-tributylol benzene; and the like.

Aromatic polyfunctional acids or their esters may also be employed in this invention as chain-branching agents, and particularly those having the formula:

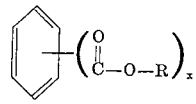

wherein R is H or an alkyl group containing one to three carbon atoms and $x$ is an integer of 3 or 4. As examples of compounds having the above formula, there may be named trimesic acid, trimethyl trimesate, and tetramethyl pyromellitate, and the like. In addition, there may be employed mixtures of the above acids and esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

The chain-branching agents may be employed in the preparation of the polyesters and copolyesters in amounts ranging from 0 to 0.7 mole percent, based on the amount of dicarboxylic acid or ester-forming derivative thereof employed in the reaction mixture. If the chain-branching agent is tetra-functional, as for example, pentaerythritol, quantities not in excess of 0.45 mole percent should be used. The preferred concentration of a tetra-functional chain-branching agent is about 0.2 mole percent. If a tri-functional chain-branching agent, such as for example, trimesic acid, is used, somewhat more is required for results equivalent to that of the tetra-functional chain-branching agent, and amounts up to 0.7 mole percent may be used. The preferred concentration of a tri-functional chain-branching agent is 0.5 mole percent.

In the practice of the present invention, the dibasic acid or ester-forming derivative thereof, the glycol, and the alkoxy polyoxyalkylene glycol are charged to the reaction vessel at the beginning of the first stage of the esterification reaction, and the reaction proceeds as in any well-known esterification polymerization. If desired, the chain-branching agent may also be charged to the reaction vessel at this time.

When preparing the polyester from an ester, such as dimethyl terephthalate, the first stage of reaction may be carried out at 170°to 180° C. and at a pressure of 0 to 7 p.s.i.g. If the polyester is prepared from the acid, such as terephthalic acid, the first stage of reaction may be carried out at about 220° to 260° C. and at pressures of from atmospheric to about 60 p.s.i.g. The methanol or water evolved during the first stage of reaction is continuously removed by distillation. At the completion of the first stage, the excess glycol, if any, is distilled off prior to entering the second stage of the reaction.

In the second or polymerization stage, the reaction may be conducted at reduced pressures and preferably in the presence of an inert gas, such as nitrogen blanket over the reactants, the blanket containing less than 0.003 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° to 300°C. This stage of the reaction may be effected either in the liquid melt or solid phase. In the liquid phase, particularly, reduced pressures must be employed in order to remove the free ethylene glycol which emerges from the polymer as a result of the condensation reaction.

Although the process of this invention may be conducted stepwise, it is particularly adaptable for use in the continuous product of polyesters. In the preparation of the described polyesters, the first stage of the reaction takes place in approximately ¾ to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum, depending on catalyst concentration, temperature, viscosity desired, and the like.

The linear condensation polyesters, produced in accordance with the present invention, have specific viscosities in the order of about 0.25 to 0.6, which represent the fiber- and filament-forming polymers. It is to be understood, of course, that nonfiber-forming polyesters may be produced by means of the present invention, which have a greater or less melt viscosity than that specified above.

Specific viscosity, as employed herein, is represented by the formula:

$$Nsp = \frac{\text{Time of flow of the polymer solution in seconds}}{\text{Time of flow of the solvent in seconds}} - 1$$

Viscosity determinations of the polymer solutions and solvent are made by allowing said solutions and solvent to flow by force of gravity at about 25° C. through a capillary viscosity tube. In all determinations of the polymer solution viscosities, a solution containing 0.5 percent by weight of the polymer dissolved in a solvent mixture containing 2 parts by weight of phenol and 1 part by weight of 2,4,6-trichlorophenol, based on the total weight of the mixture is employed.

The polyesters of this invention may be produced to form filaments and films by melt-spinning methods and can be extruded or drawn in the molten state to yield products that can be subsequently cold-drawn to the extent of several hundred percent of their original lengths, whereby molecularly oriented structures of high tenacity may be obtained. The condensation product can be cooled and comminuted followed by subsequent remelting and processing to form filaments, films, molded articles, and the like.

Alternatively, the polyesters of this invention may be processed to shaped objects by the wet-spinning method, wherein the polyesters are dissolved in a suitable solvent and the resulting solution is extruded through a spinnerette into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity and to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or those agents may be incorporated with the initial reactants. Such added agents might be plasticizers, antistatic agents, fire-retarding agents, stabilizers, and the like.

To further illustrate the present invention and the advantages thereof, the following specific examples are given, it being understood that these are merely intended to be illustrative and not limitative. Unless otherwise indicated, all parts and percents are by weight.

The following procedure was used to prepare the polymers in the examples. The charge was added directly to a standard polyester autoclave and the system was purged six times with nitrogen, allowing the pressure to rise to 150 p.s.i.g., and then releasing it slowly to atmospheric pressure each time. Heat was then applied to the closed system, and when the temperature inside the autoclave had reached 100° to 125° C., the stirrer was started. When the temperature of the outside wall of the autoclave had reached about 250° C. (the inside temperature being about 230° C. to 235° C. and the pressure being about 25 p.s.i.g.), the off-vapor valve was adjusted to maintain these conditions of temperature and pressure. As the first distillate containing water and some ethylene glycol appeared, the esterification stage was considered to have started. The stirrer speed was set at 240 r.p.m. This esterification step usually took from about 40 to 60 minutes for completion, after which the pressure of the system was adjusted to atmospheric pressure. The heating rate was then increased until the temperature reached about 280°C. During this time, excess ethylene glycol was distilled off. An ethylene glycol slurry of titanium dioxide was introduced through an injection port when the inside temperature had reached about 260°to 265°C. Then the inside temperature was raised to about 280° C. the pressure was maintained at less than 2 mm. Hg. and the polymerization continued until a polymer having a specific viscosity in the fiber-forming range between 0.30 to less than about 0.4 was formed. The polymer was extruded through a spinnerette, and the filaments obtained were drawn about 5 times their original length over a hot pin at about 80°C.

Figure 2:
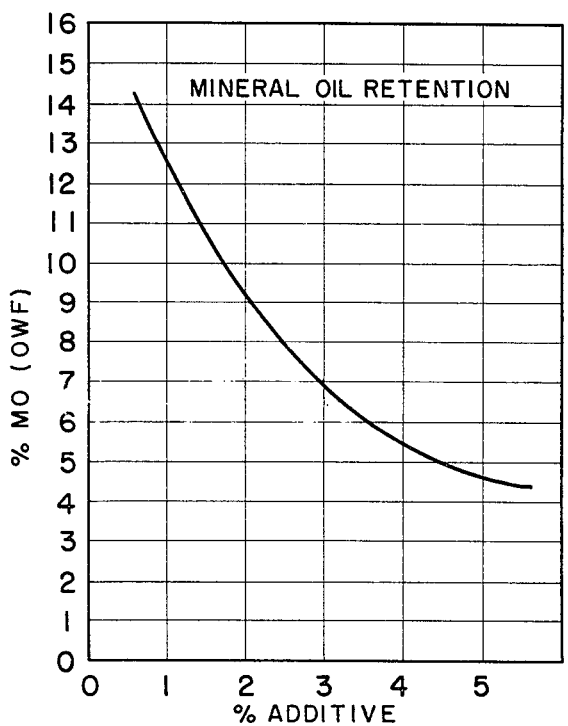

The oil stain retention and release tests used throughout the examples were based on mineral oil retention on a fabric prepared from a 50/10 continuous filament prepared in accordance with this invention and plied three times into a 150/30 knitting yarn, thereafter knitted with a 70-gauge knitting head at 86 courses per inch and 36 wales per inch. Rectangular sample fabric swatches from 6–12 grams were cleaned by extraction for four hours with methanol; then by a 4-hour extraction with hexane. They were each stained with mineral oil by tumbling in a jar of "Squibb" heavy liquid petroleum for 4 hours. A fresh aliquot of the oil was used for each staining. After tumbling, excess mineral oil was removed from the swatch samples by padding on a Butterworth Laboratory Padder. Two passes through the rollers at 50 pounds pressure were made. The first pass removed most of the oil. On the second pass, the swatches were sandwiched between paper towels to remove residual oil between fibers. This technique provided a fairly uniform pick-up on all samples averaging about 21 percent based on the weight of the fiber. Fabric samples were laundered in a Kenmore laboratory washer (Catalogue No. 3057340) for 15 minutes followed by two rinse cycles of 10 minutes each. Initial water temperature was 160° F. for both washing and rinsing. Concentration of detergent was 1 gram/liter. The detergent used was a standard commercial detergent, "Tide (XK)." The liquor-to-fabric ratio was approximately 135:1. Fabric samples were then tumbled dry in a "Sears (Lady Kenmore)" dryer with the "dryness control" set on 4. Fabric samples were then extracted with hexane for about 2 hours and the hexane extracts were evaporated in aluminum cups. The residual percent mineral oil based on the weight of the fibers was determined by the weight of the mineral oil remaining in the cups. Each fabric sample was tested five times, the average thereof being shown on FIGS. 2 and 3. Consecutive use of the samples, as described, indicate that oil retention and release qualities are not affected by continuous washing. As used herein, the word "permanent" describes a quality resistant to effects of wash and wear and retained so long as the structural integrity of the fibers, filaments, etc. is maintained.

During the processing of polyester filaments, staple, blends, fabric, and the like, heating at various temperatures for various periods of time is often necessary, e.g., polyester fabrics may be subjected to temperatures of 175° C. or higher for periods up to 10 minutes or more. The following thermal stability test was run where indicated: A 5-gram sample of the polyester was fluffed into a ball, placed in an aluminum cup into which about 10 ½-inch holes had been punched, and the ball was heated for 10 minutes at 175° C. in a circulating-air oven, with a thermo-couple held at the center of the ball.

EXAMPLE 1

The autoclave was charged with 166 grams of terephthalic acid, 400 ml. of ethylene glycol, 0.078 gram of lithium sulfate, 0.967 gram of antimony trioxide, 0.20 gram of pentaerythritol; and 10 grams of methoxypolyethylene glycol having an average molecular weight of about 550. Polymer and fiber were prepared following the procedure described above.

The fiber fused severely when heated at 175° C. for 10 minutes, the thermo-couple within the carded ball recording a temperature of 220° C.

EXAMPLE 2

The autoclave was charged with 165 grams terephthalic acid, 330 ml. ethylene glycol, 0.04 gram lithium acetate, 0.1 gram antimony glycoloxide, 0.2 gram pentaerythritol, and 10 grams of the reaction product of 14 molar equivalents of ethylene oxide with an approximately equimolar mixture of straight chain alcohols having 14–15 carbon atoms. Polymer and fiber were prepared following the procedure described in example 1. The sample was tested for heat stability and resisted fusion when heated at 175° C. for 10 minutes. When tested for oil stain retention and release, the sample was found to have retained less than 5 percent based on the weight of the fiber, of the mineral oil.

EXAMPLES 3–13

The autoclave was charged with 165 grams terephthalic acid, 330 ml. ethylene glycol, 0.04 gram lithium acetate, 0.1 gram antimony glycoloxide, 0.3 gram pentaerythritol, and 10 grams (5 percent by weight based on the polymer) of the following chain-terminating compounds:

| Example | Compound Structure R—O[$CH_2CH_2O$]—H* |
|---|---|
| 3 | None |
| 4 | R=14–15; $x$=4 |
| 5 | R=12–13; $x$=9 |
| 6 | R - 22; $x$ =12 |
| 7 | R=20; $x$=12 |
| 8 | R=13; $x$=12 |
| 9 | R=8; $x$=12 |
| 10 | R=14–15; $x$=30 |
| 11 | R=4; $x$=12 |
| 12 | R=12; $x$=20 |
| 13 | R=1; $x$=45 |

*where R is an alkyl radical having the number of carbon atoms indicated.

Fabric samples were prepared for oil stain retention and release as described above; and the results of the mineral oil retention and release testing are illustrated by FIG. 3.

We claim:

1. A fiber-forming thermally stable synthetic linear condensation polyester consisting of at least 85% by weight of an ester of a glycol selected from HO($CH_2$)$_n$OH, in which $n$ is an integer from 2 to 10, and cyclohexanedimethanol and terephthalic acid, modified with about 0.25 to 3.0 mole percent based on the weight of terephthalic acid of a chain-terminating additive having a general formula: $R-O[G-O]_x-H$, where R is an alkyl group containing at least eight carbon atoms; G is a hydrocarbon radical selected from the group consisting of ethylene, and propylene, and $x$ is an integer having a value at least equal to or greater than 9, and no greater than about 20; said polyester having inherent permanent oil stain release characteristics when in fiber form.

2. The composition of matter described in claim 1 wherein R is an alkyl group containing an average of 12 carbon atoms and $x = 20$.

3. The new composition of matter described in claim 1 wherein R is an alkyl group containing an average of eight carbon atoms and $x = 12$.

4. The new composition of matter described in claim 1 wherein R is an alkyl group containing an average of 14-15 carbon atoms and $x = 14$.

5. The new composition of matter described in claim 1 wherein said additive is present in an amount of about 0.75–2.0 mole percent.

6. The new composition of matter described in claim 1 wherein the synthetic linear condensation polyester is the polyester of terephthalic acid and ethylene glycol, and further modified with up to about 0.45 mole percent, based on the amount of terephthalic acid, of a tetra-functional chain-branching agent.

7. The new composition of matter defined in claim 6 wherein the chain-branching agent is pentaerythritol.

8. The new composition of matter described in claim 1 wherein the synthetic linear condensation polyester is the polyester of terephthalic acid and ethylene glycol, and further modified with up to about 0.7 mole percent, based on the moles of the repeating unit of said polyester, of a tri-functional chain-branching agent.

9. The new composition of matter defined in claim 8 wherein the chain-branching agent is trimesic acid.

10. The new composition of matter defined in claim 6 wherein the chain-branching agent is pentaerythritol, in an amount of about 0.2 mole percent, based on the weight of terephthalic acid.

11. The new composition of matter defined in claim 8 wherein the chain-branching agent is trimesic acid in an amount of about 0.5 mole percent based on the weight of the terephthalic acid.

* * * * *